(No Model.) 2 Sheets—Sheet 1.

C. C. & F. G. NAGLEY.
TRANSPLANTING MACHINE.

No. 467,428. Patented Jan. 19, 1892.

WITNESSES:
C. L. Bendixon
J. J. Laass

INVENTORS:
Charles C. Nagley
Frank G. Nagley
By Duell, Laass & Duell
their ATTORNEYS.

(No Model.) 2 Sheets—Sheet 2.
C. C. & F. G. NAGLEY.
TRANSPLANTING MACHINE.
No. 467,428. Patented Jan. 19, 1892.
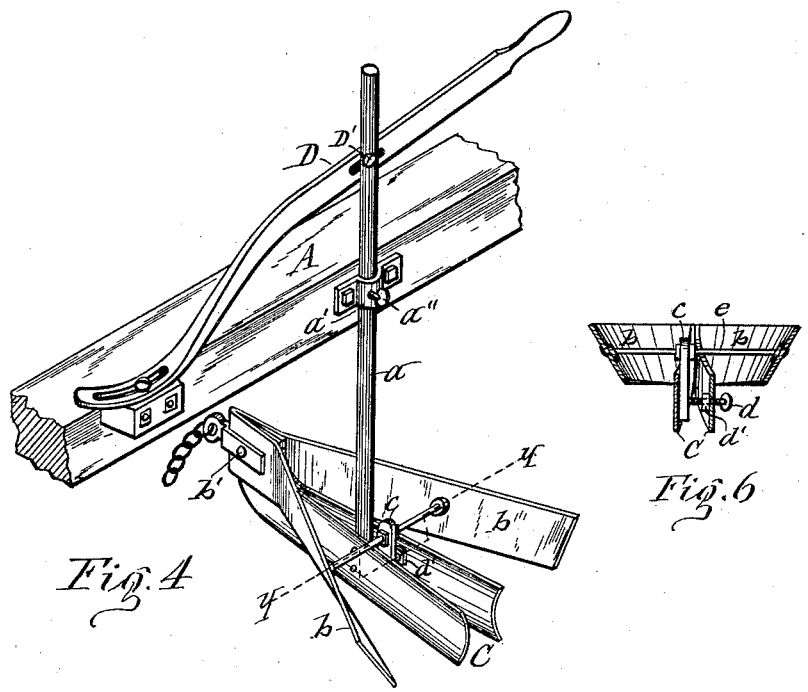
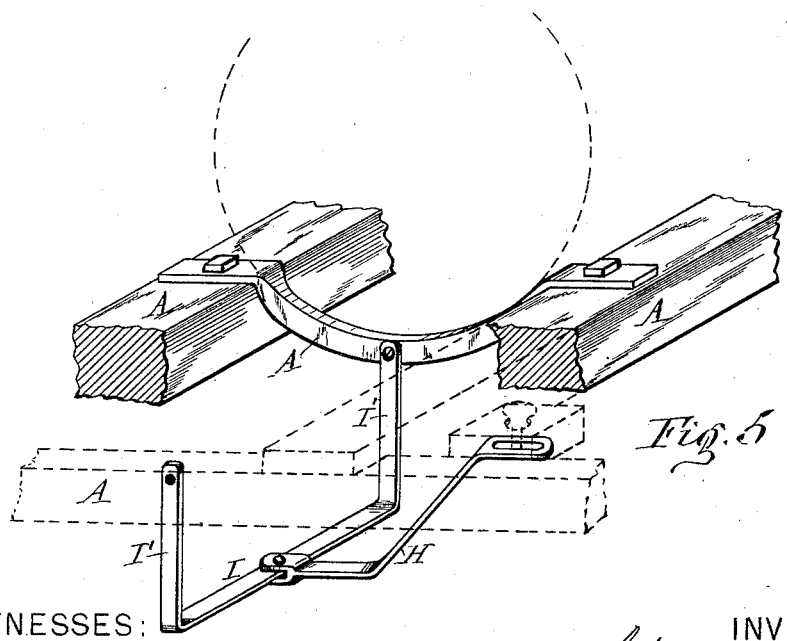
WITNESSES:
C. L. Bendixon
J. J. Laass
INVENTORS:
Charles C. Nagley
and Frank G. Nagley
By Duell, Lanser Duell
their ATTORNEYS.

UNITED STATES PATENT OFFICE.

CHARLES C. NAGLEY AND FRANK G. NAGLEY, OF MEMPHIS, NEW YORK.

TRANSPLANTING-MACHINE.

SPECIFICATION forming part of Letters Patent No. 467,428, dated January 19, 1892.

Application filed June 8, 1891. Serial No. 395,457. (No model.)

*To all whom it may concern:*

Be it known that we, CHARLES C. NAGLEY and FRANK G. NAGLEY, of Memphis, in the county of Onondaga, in the State of New York, have invented new and useful Improvements in Transplanting-Machines, of which the following, taken in connection with the accompanying drawings, is a full, clear, and exact description.

This invention has reference to the class of machines which are employed for transplanting tobacco, cabbage, and other plants—chiefly tobacco.

The object of this invention is to provide a transplanting-machine which shall be more efficient and convenient in its operation; and to that end the invention consists in the improved construction and combination of parts hereinafter described, and set forth in the claims.

Figure 1:
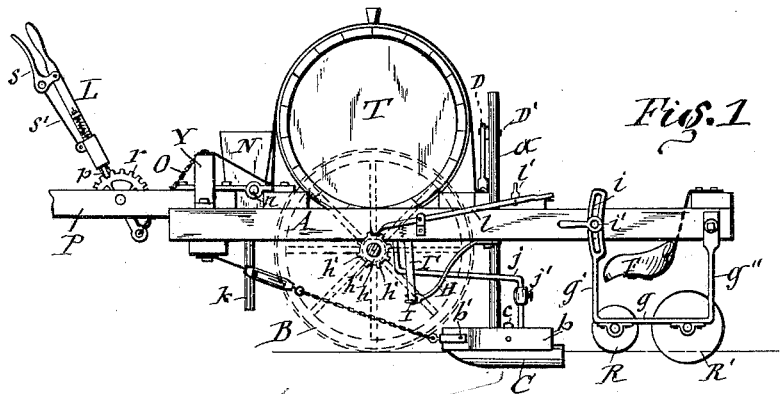
Figure 2:
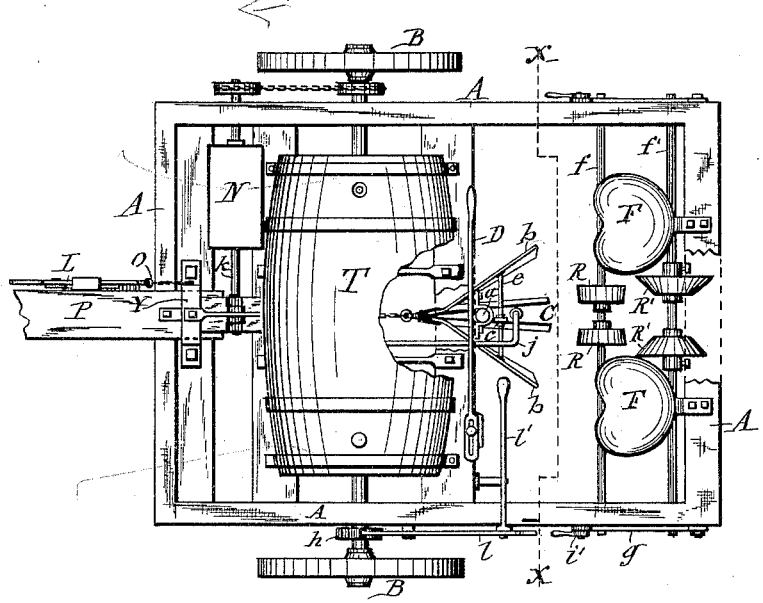
Figure 3:
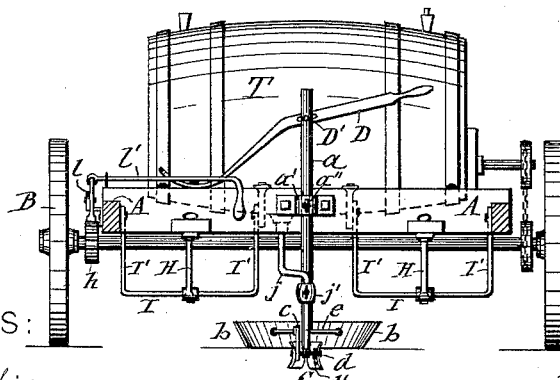

In the annexed drawings, Figure 1 is a side elevation of a transplanting-machine embodying our improvements. Fig. 2 is a plan view of the same with a portion broken away to illustrate more important features of the invention. Fig. 3 is a vertical transverse section on line $x\ x$, Fig. 2. Fig. 4 is an enlarged detached perspective view of the plow and scraper. Fig. 5 is an enlarged perspective view of the adjustable foot-rest; and Fig. 6 is a transverse section on line $y\ y$, Fig. 5.

Similar letters of reference indicate corresponding parts.

A represents the frame of the machine, which is mounted on the axle of carrying-wheels B B.

C represents our improved plow which is employed for cutting the furrow into which the plants are to be set. This plow we form of two elongated plates united at their front ends and diverging only slightly from each other rearward, leaving barely sufficient room between them to allow the attendants to set the plants in the furrow while held open by the plow.

In order to cause the furrow to automatically close itself behind the plow we form the rear end portions of the two plow-plates with outwardly-turned bottom portions C' C', as clearly shown in Fig. 4 of the drawings, said bottom portions undercutting the sides of the narrow furrow so as to cause the latter to cave in as soon as relieved from the pressure of the plow. The main portions of the widths of the plow-plates are vertical, and the the top edges of the plates we preferably also turn out sufficient to prevent the ground at opposite sides of the plow from rolling over the top of the plow and into the furrow while cutting the same. To allow it to be adjusted to cut the furrow to the desired depth or to be raised above the ground in taking the machine to and from the field, we connect the plow to the frame A by means of a post $a$, the foot of which is firmly attached to the plow, and the upper end portion thereof is adjustably clamped in any suitable manner to one of the cross-beams of the frame A, said clamp being represented in the form of a sleeve $a'$, fastened to the frame and receiving the post through it, and a set-screw $a''$, connected to the sleeve, engages the post, as best seen in Fig. 4 of the drawings.

To facilitate the operation of raising and lowering the plow, we fulcrum on the frame A a lever D, which extends across the post $a$ and is suitably connected thereto, as shown at D' in Fig. 4.

To better adapt the plow for working on a hillside, we make the plow adjustable to stand at an angle to the line of draft by making the post $a$ of cylindrical form, so as to allow it to be turned in the sleeve $a'$ and secured in said position by the set-screw $a''$.

$b$ denotes our improved scraper, which we employ for the purpose of removing stones, sods, and lumps from the top of the furrow, in which the plants are set, and in order to drag the said substances so as to prevent the same from falling back over the top of the scraper we cant or incline said scraper outward from bottom to top, as clearly shown in Figs. 4 and 6 of the drawings. This scraper obviously is to be sufficiently in front of the plow to clean the surface of the ground before the opening of the furrow, and therefore said scraper may be detached from the plow and carried on any suitable support attached to the frame A. However, for simplicity and compactness of construction, we prefer to attach said scraper to the front end of the plow, as shown. The scraper consists of two elongated plates formed in one piece embracing the front end of the plow and extending gradually divergent from opposite sides thereof. The bottom of the scraper b is in a plane above the bottom of the plow, so as to scrape merely the surface of the ground, and in order to allow the scraper to be adjusted in its requisite elevation above the bottom of the plow we pivot the scraper transversely to the front end the plow, as at b', and carry the rear portion of the scraper on a vertically-adjustable support attached to the plow. This support we prefer to form of a short post c, clamped on the inner side of one of the plow-plates by a set-screw d, passing through the other plow-plate and through a nut d' and pressing the post c against the adjacent side of the plow, as best seen in Fig. 6 of the drawings.

To the rear portion of the scraper is attached a cross-bar e, which passes through the upper end of the post and is sustained laterally by nuts or collars on the cross-bar bearing on opposite sides of the post.

R R represent the ground-pressing rollers, which pack the ground around the plants, and R' R' denote rollers which are at the rear of the pressing-rollers and ridge the ground against opposite sides of the row of plants. Said two sets of rollers are mounted on shafts f f', which extend across the machine and are journaled to brackets attached to the frame A.

To allow the rollers R R to be adjusted to press with greater or less force on the ground, we connect their supporting-brackets vertically adjustable to the frame A, and preferably form each of the brackets of a longitudinally-disposed bar g, to which the shafts f f' are journaled, and vertical arms g' g'', extending from said bar. The rear arm g'' is pivotally connected to the frame A, and the upper end of the front arm g' is provided with a vertical slot i, through which passes a bolt connected to the frame and provided with a clamping-nut i'. The aforesaid rollers are adapted to be shifted longitudinally on their shafts, and thus adjusted to the desired distances from the row of plants, and by means of set-screws passing through the hubs of the rollers they are secured in their adjusted positions on the shafts.

In this machine the plants are set in the furrow by persons riding on the seats F F, secured to the rear portion of the frame A, and having their feet on foot-rests I I. In order to allow these foot-rests to be adjusted to the length of the person's legs, we form each of said foot-rests with vertical arms I' I', which are pivotally connected to the frame A, and to the foot-rest proper I we connect a brace H, which extends rearward and is provided with a longitudinal slot in its rear end, through which passes a bolt clamping the brace on the frame A.

Inasmuch as it is desired to set the plants uniform distances apart, we connect to our machine a timer l', consisting of a lever pivoted intermediate of its length to the frame A and actuated by a timing-hub h, secured to the hub of one of the wheels B and provided with projections h' h' on its periphery. An intermediate lever l is pivoted to the frame A, and has one end riding on the hub h and the opposite end connected to the lever l. In the movement of the machine the projections h' h' of the hub h intermittently oscillate the levers l l', and the oscillations thereof indicate the time for setting the plants.

T denotes the barrel or tank containing the water to be applied to the plants. A pipe j leads from said water-receptacle to the space between the rear end portions of the plow-plates, and is provided with a stop-cock j', by which to control the flow of water to the plants.

N represents the usual phosphate-hopper having a discharge-pipe k leading to the ground in front of the plow C.

In order to allow the machine to be easily turned about at the end of each row of plants, we hinge the pole P to the front end of the frame A, as shown at n, and secure to the frame a yoke Y, which rises over the rear end of the pole, as shown in Fig. 1 of the drawings, and to the side of the pole we pivot a lever L, which extends some distance beneath its pivot and has its lower end connected to the upper part of the yoke Y by a chain or rod O. By pulling the upper end of the lever L rearward, the frame A, with its appurtenances, is tilted longitudinally, so as to raise the rear portion of the machine sufficiently to carry the plow C, scraper b, and rollers R R' clear above the ground and thus permit the machine to be easily turned about. The aforesaid tilting of the machine is easily effected, inasmuch as the machine is mounted on a single axle and sufficiently balanced for the aforesaid purpose. The machine is tilted, as aforesaid, during the transit of the machine to and from the field, and in order to allow the machine to be locked in said tilted position we attach to the side of the pole P a notched segment r, with which engages a pawl p, connected to the lever. A hand-lever s is pivoted to the upper end of the lever L and connected to the pawl p by a rod s', to facilitate the withdrawal of said pawl from the segment r when desired.

Having described our invention, what we claim as new, and desire to secure by Letters Patent, is—

1. In a transplanting-machine, a ground opening and closing plow consisting of two elongated plates united at their front ends and slightly diverging rearward and having the bottom portions of the rear ends turned outward to undercut the sides of the furrow and cause the furrow to automatically close itself behind the plow, as set forth.

2. In a transplanting-machine, the combination, with the plow, of a scraper in front of said plow and disposed with its bottom edge in a plane above that of the plow and canted outward from bottom to top, substantially as and for the purpose set forth.

3. The combination, with the plow, of scraper-plates pivoted transversely to opposite sides of the front of the plow, canted outward from bottom to top, and disposed with their bottom edges in a plane above the bottom of the plow, and a vertical adjustable support connecting the rear ends of the scraper-plates to the plow, as set forth.

4. The combination, with the plow, of scraper-plates secured to the front end of the plow with the bottom of said plates above the bottom of the plow and detached and distended laterally therefrom at their rear ends and canted outward from bottom to top, substantially as described and shown.

5. The combination, with the plow, of scraper-plates pivoted transversely to opposite sides of the front end of the plow, canted outward from bottom to top and disposed with their bottom edges in a plane above that of the plow, a post secured vertically adjustable to the plow, and a cross-bar connecting the rear portion of the scraper-plates to the aforesaid post, substantially as set forth and shown.

6. In a transplanting-machine, the plow connected to the frame adjustably in its position in relation to the line of draft, as set forth.

7. In a transplanting-machine, the combination, with the frame mounted on carrying-wheels, of a post connected to the frame and adapted to turn axially thereon, a clamp or set-screw securing the post in its position, and the plow rigidly secured to the foot of the post, as set forth.

8. The combination, with the frame, of brackets consisting of longitudinally-disposed bars each provided with vertical arms, one of which is pivotally connected to the frame and the other provided with a vertical slot, a bolt connected to the frame and passing through the aforesaid slot, a clamping-nut on said bolt, shafts extending across the machine and journaled to the longitudinal bars of the aforesaid brackets, and ground-pressing rollers and ridgers connected respectively to the aforesaid shafts, substantially as set forth.

9. In combination with the frame and seats connected thereto, foot-rests provided with vertical arms pivotally connected to the frame, and braces extending from the foot-rests lengthwise of the frame and adjustably connected to the frame, as set forth.

10. In a transplanting-machine mounted on carrying-wheels, the combination of a hub secured to one of said wheels and provided with projections on its periphery, and a timing-lever pivoted to the frame and actuated by the aforesaid hub, as set forth.

11. In a transplanting-machine mounted on carrying-wheels, the combination of the hub $h$, provided with the projections $h'$ $h'$, the lever $l$, fulcrumed on the frame and having one end riding on the aforesaid hub, and the timing-lever $l'$, pivoted to the frame and connected at one end to the lever $l$, substantially as described and shown.

In testimony whereof we have hereunto signed our names this 3d day of June, 1891.

CHARLES C. NAGLEY. [L. S.]
FRANK G. NAGLEY. [L. S.]

Witnesses:
MARK W. DEWEY,
C. L. BENDIXON.